T. T. LOVELACE.
ROTARY MOTOR.
APPLICATION FILED AUG. 13, 1915.

1,277,964.

Patented Sept. 3, 1918.
4 SHEETS—SHEET 3.

WITNESSES

INVENTOR
T. T. Lovelace
BY
ATTORNEYS

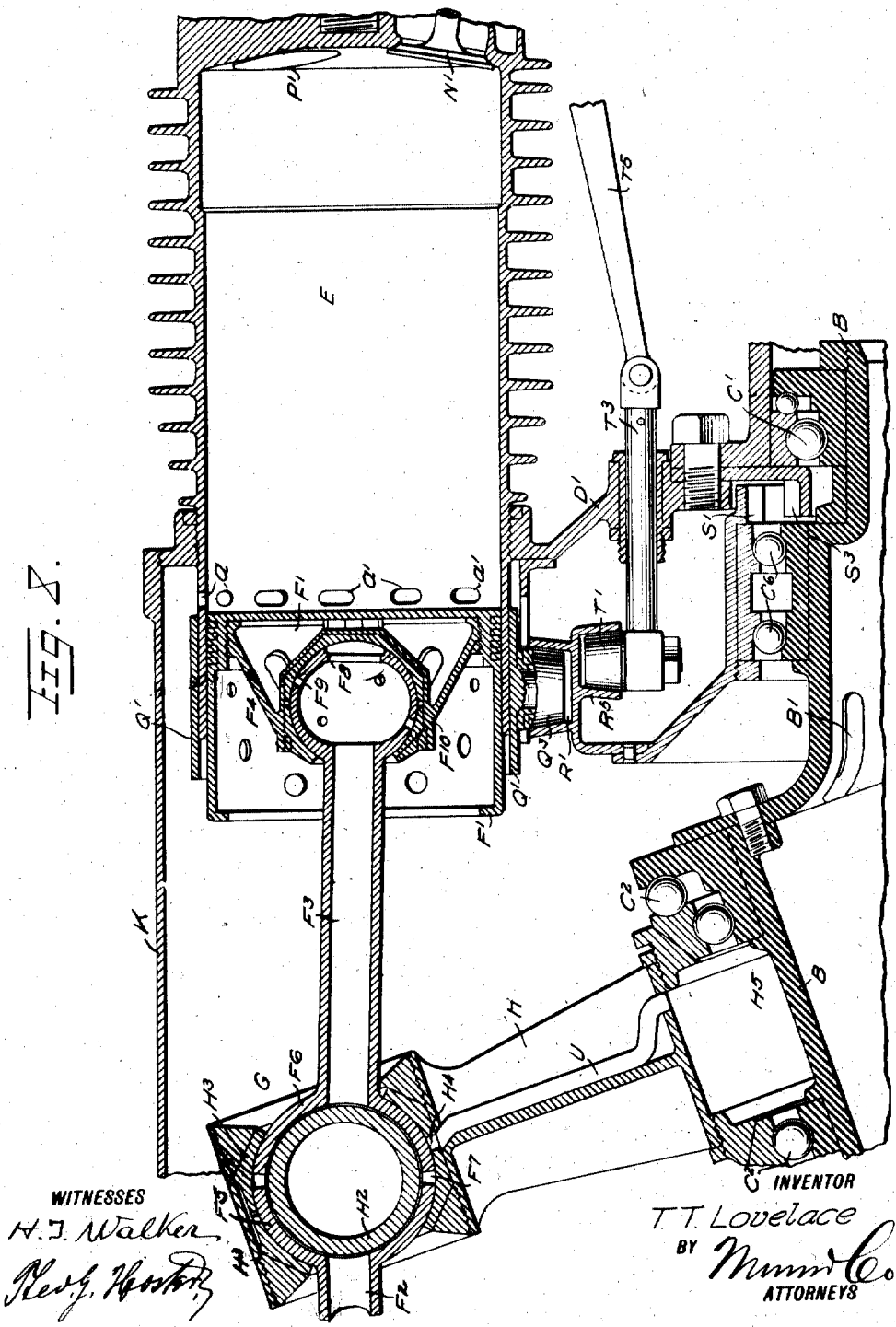

UNITED STATES PATENT OFFICE.

THOMAS T. LOVELACE, OF NEW YORK, N. Y.

ROTARY MOTOR.

1,277,964.  Specification of Letters Patent.  Patented Sept. 3, 1918.

Application filed August 13, 1915. Serial No. 45,323.

*To all whom it may concern:*

Be it known that I, THOMAS T. LOVELACE, a citizen of the United States, and a resident of the city of New York, borough of Manhattan, in the county and State of New York, have invented a new and Improved Rotary Motor, of which the following is a full, clear, and exact description.

The invention relates to the type of rotary motors having a plurality of cylinders with their axes parallel to each other and revolving bodily around a common axis at a right angle to the plane of rotation of the cylinders.

The object of the invention is to provide a new and improved rotary motor or engine which permits the use of a large number of cylinders in an exceedingly compact form and which is capable of developing a very high speed and high power at the same time reducing head resistance to a minimum thus rendering the motor very serviceable for aviation or other purposes.

In order to accomplish the desired result, use is made of two groups of cylinders, the cylinders in each group being arranged around a common axis and with the axes of the cylinders of each group parallel to each other and parallel to the said common axis, the groups of cylinders being spaced apart and being mounted to rotate bodily transversely to their axes, pistons reciprocating in the said cylinders, and a stroke element intermediate the groups of cylinders and rotating in a plane at an angle to the plane of rotation of the said groups of cylinders, the said pistons being connected with the said stroke element.

A practical embodiment of the invention is represented in the accompanying drawings forming a part of this specification, in which similar characters of reference indicate corresponding parts in all the views.

Fig. 8 is an enlarged longitudinal central section of a portion of the rotary engine.

The rotary motor is mounted on a suitable framework, preferably in the form of two spiders A, A′, adapted to be attached to an aeroplane in case the motor is used for aviation purposes, or to a suitable foundation if used for other purposes. To the spider A is secured a central hollow support B provided with spaced ball bearings C, C′ on which are mounted to rotate the cylinder carriers D, D′ on which are fastened two groups of cylinders E, E′ containing pistons F, F′ having their piston rods $F^2$, $F^3$ connected by universal joints G with a stroke element H mounted to rotate on angular ball bearings $C^2$ arranged on the central support B. The cylinders E and E′ of each group are grouped around a common axis and with the axes of the cylinders of each group parallel to each other and parallel to the common axis, which coincides with the axis of the central support B and that of the carriers D and D′. By the arrangement described, the cylinders are mounted to rotate bodily transversely to their axes. The cylinders of the two groups are arranged in pairs and with the axis of one cylinder E coinciding with the axis of the corresponding cylinder E′ of the pair, and the adjacent ends of the cylinders E and E′ are spaced apart to provide sufficient space to accommodate the stroke element which rotates in a plane at an angle to the plane of rotation of the groups of cylinders E and E′ and their carriers D and D′.

The cylinder carriers D and D′ are rigidly connected with each other by hollow bars I to cause the carriers D and D′ to rotate in unison with each other. The connecting bars I are provided with guideways I′ engaged by ball bearings H′ held on the stroke element H to guide the latter in its reciprocating motion and to hold it to the same speed of revolution as the cylinders. The cylinder carrier D′ is provided with a central hub extension $D^2$ keyed or otherwise fastened to a hollow shaft $D^3$ journaled in ball bearings $C^3$ and $C^4$, of which the ball bearing $C^8$ is arranged on the spider A′. The shaft $D^8$ extends beyond the spider A′ and is adapted to carry a propeller wheel J in case the motor is used for aviation purposes, or the said shaft $D^3$ may be connected by gear wheels, pulleys or other means, with other machinery for transmitting the power of the motor to such other machinery. It is understood that by the use of the bars I the power of the rear engine having the cylinders E is transmitted to the forward engine having the cylinders E' and the shaft $D^3$. The cylinder carriers D and D' are in the form of disks, in which the cylinders E and E' are screwed or otherwise secured, and the outer edges of the carriers are connected with each other by a case K to form a closed space intermediate the said cylinders and in which rotates the stroke element H.

Figure 1:
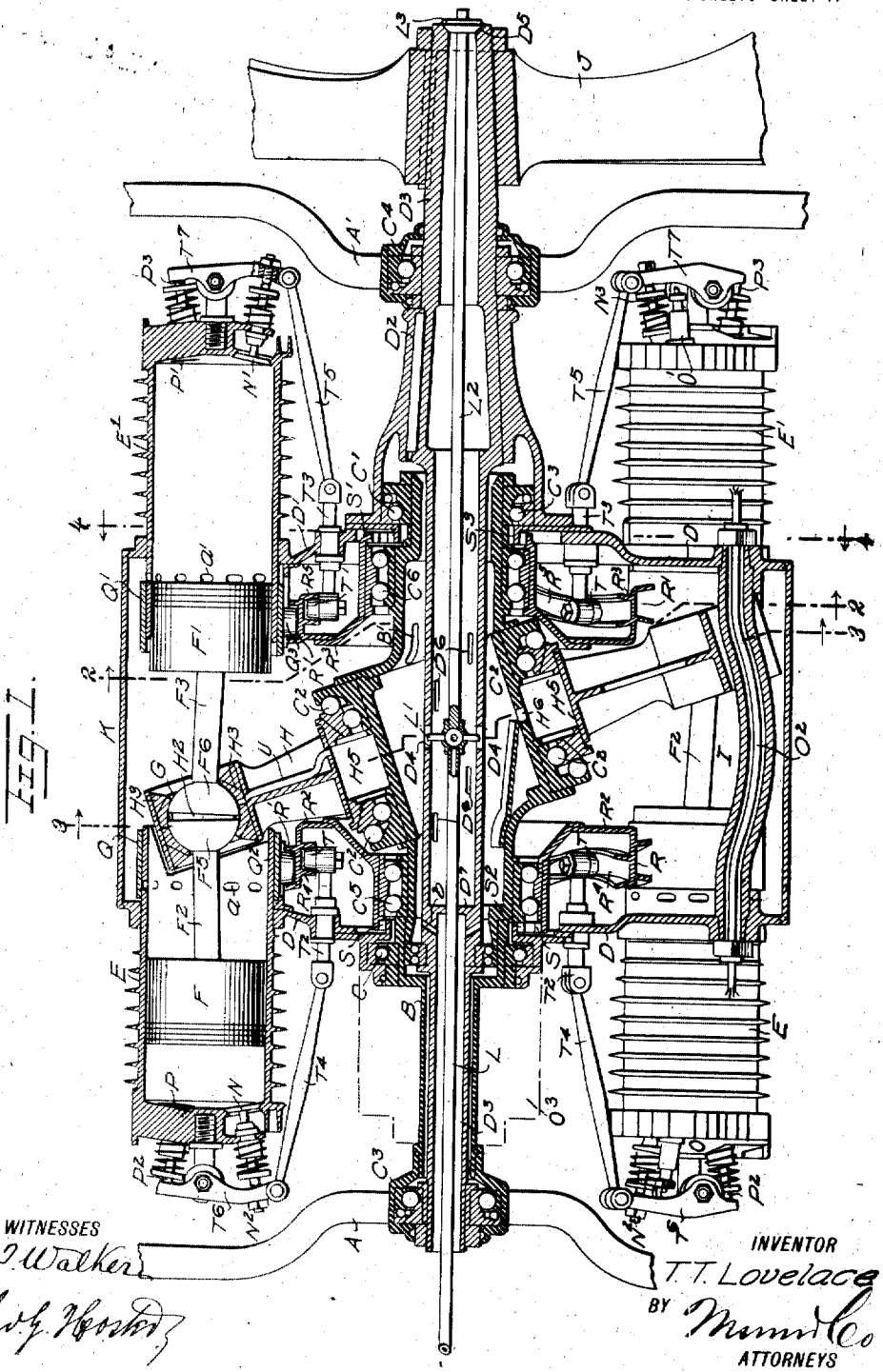
Figure 1 is a longitudinal central section of the rotary motor.
Figure 2:
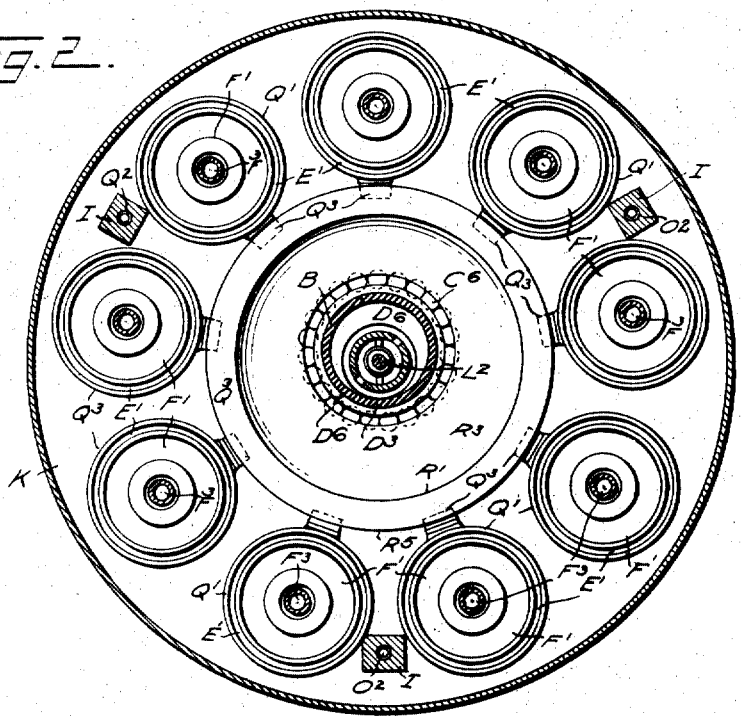
Fig. 2 is a cross section of the same on the line 2—2 of Fig. 1.
Figure 3:
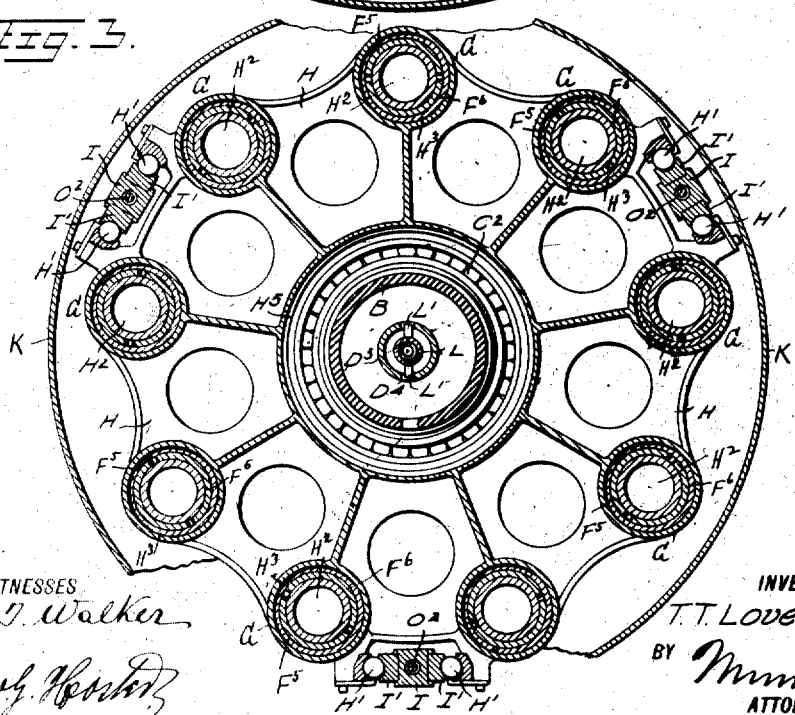
Fig. 3 is a similar view of the same on the line 3—3 of Fig. 1.
Figure 4:
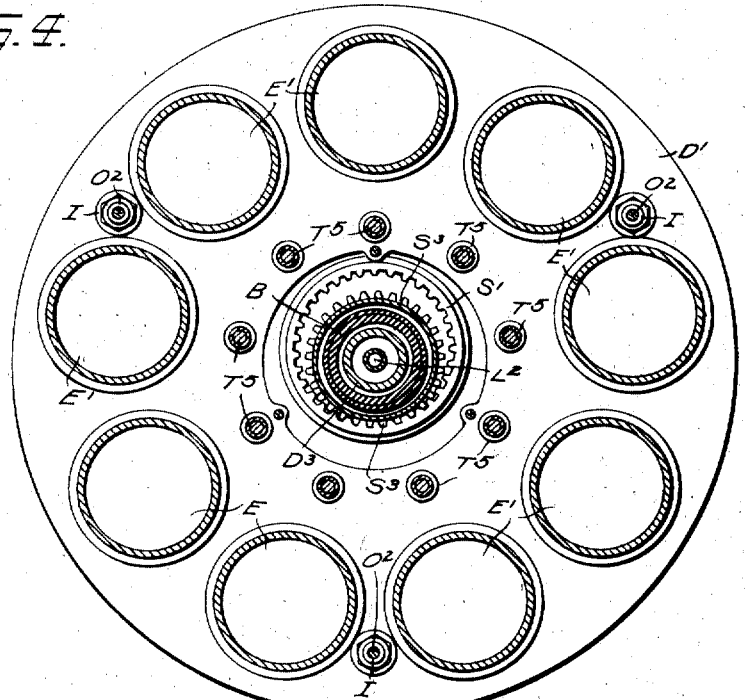
Fig. 4 is a similar view of the same on the line 4—4 of Fig. 1.
Figure 5:
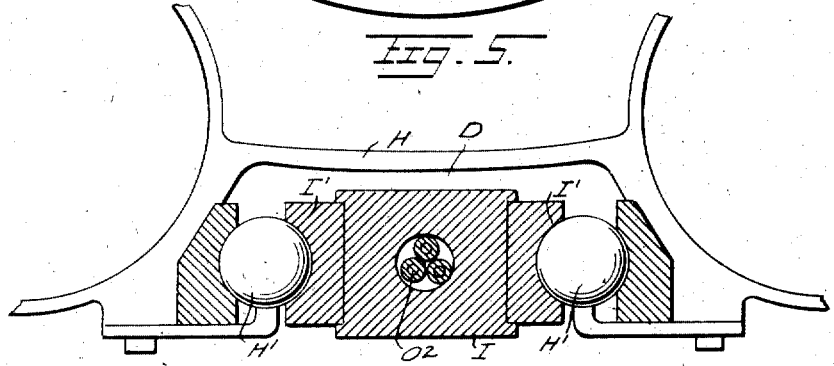
Fig. 5 is an enlarged cross section of one of the rigid connections between the groups of cylinders and the sliding connection of the stroke element with the said rigid connection.
Figure 6:
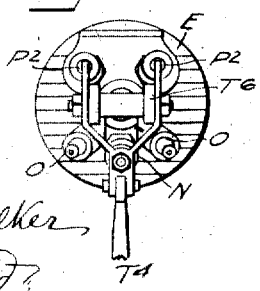
Fig. 6 is an elevation of the outer end of one of the cylinders showing the exhaust valves, the air inlet valve and the ignition devices.
Figure 7:
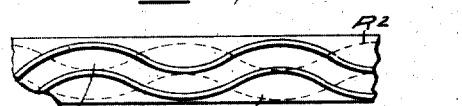
Fig. 7 is an enlarged face view of a portion of the cam for controlling the valve mechanism.

A non-explosive gaseous fuel is supplied to the interior of the case K in the following manner: A supply pipe L extends through the left-hand side of the hollow shaft $D^3$ and the outer end of this pipe is connected by a pump or the like with a fuel supply for forcing the fuel through the pipe L and by branch pipes L' through openings $D^4$ into the central support B adjacent the ball bearings $C^2$, the said support having openings or ports B' opening into the case K. The cylinders E and E' are provided near their inner open ends with inlet ports $a$, $a'$ opening into the case K to allow the gaseous fuel to pass from the case K into the cylinders E and E' at the time the corresponding piston F or F' is at the end of its suction stroke and uncovers the corresponding ports $a$ or $a'$. Thus, as shown in the top of Fig. 1, the piston F' has uncovered the ports $a'$ in its cylinder E' to allow the gaseous fuel to pass from the case K by way of the ports $a'$ into the cylinder E'. In the outer ends of the cylinders E, E' are arranged spring-closed air inlet valves N, N' opening inwardly to allow air to pass into the cylinders E, E' for forming with the non-explosive gaseous fuel an explosive mixture to be ignited at the proper time by suitable electric ignition devices O, O' of usual construction mounted on the outer ends of the cylinders E and E', as indicated in Fig. 6. The ignition devices O, O' are electrically connected with a source of electrical energy $O^3$ in the form of a generator, magnetos, or battery located on the support B, and the conductors $O^2$ for the ignition devices O' extend through the hollow connecting bars I, as plainly indicated in Figs. 1, 2 and 5.

The outer ends of the cylinders E and E' are also provided with spring-closed exhaust valves P, P' opened at the proper time for the escape of the products of combustion by the use of suitable valve mechanisms, hereinafter more fully described.

The opening and closing of the ports $a$, $a'$ independently of the opening thereof by the pistons F, F', as previously explained, is controlled by sleeve valves Q, Q' mounted to slide on the inner ends of the cylinder E, E'. The sleeve valves Q and Q' are provided with friction rollers $Q^2$, $Q^3$ engaging cam grooves R, R' of double cams $R^2$, $R^3$ mounted to rotate on ball bearings $C^5$, $C^6$ arranged eccentrically on the central support B. The centers of the cams $R^2$, $R^3$ are preferably disposed diametrically opposite each other to insure the proper movement of the sleeve valves Q, Q' on their corresponding cylinders E, E'. The cams $R^2$, $R^3$ are provided with internal gear wheels S, S' in mesh with gear wheels $S^2$, $S^3$ attached to or forming part of the cylinder carriers D, D' so that when the latter are rotated the gear wheels $S^2$, $S^3$ impart a rotary motion to the gear wheels S, S' and consequently to the cams $R^2$, $R^3$. The cams $R^2$, $R^3$ are provided with internal cam grooves $R^4$, $R^5$ engaged by friction rollers T, T' mounted on rods $T^2$, $T^3$ slidable in suitable bearings on the carriers D, D'. The outer ends of the rods $T^2$, $T^3$ are connected by links $T^4$, $T^5$ with levers $T^6$, $T^7$ fulcrumed on the outer ends of the cylinders E and E'. The levers $T^6$ and $T^7$ engage the spring-closed stems $P^2$, $P^3$ of the exhaust valves P and P' so as to open the latter at the proper time for the exhaust of the products of combustion from the cylinders E, E'. The levers $T^6$, $T^7$ engage the stems $N^2$, $N^3$ of the air inlet valves N, N' to close the latter at about the time the pistons F and F' have traveled inwardly about half of the length of their full stroke so that the pistons during the remainder of the suction stroke create partial vacuums in the cylinders to cause the gaseous fuel to pass into the cylinders as soon as the pistons F and F' uncover the ports $a$, $a'$. It is understood that the air admitted to the cylinders E, E' together with the gaseous fuel produces an explosive mixture to be exploded at the proper time by the ignition devices O, O', as previously mentioned. The cam grooves R and R' are so arranged that the sleeve valves Q, Q' close during the compression and exhaust periods, that is, during every other revolution the sleeve valves are closed and the said sleeve valves are only open during the suction stroke, as above explained. This prevents the burning gases entering the crank chamber at the end of the expansion stroke, thus guarding against possible explosion in case K. The rotation of the gear wheels S, $S^2$ and S', $S^3$ is such that the cams rotate at a speed of nine-tenths relatively to that of the carriers D, D', that is, relatively to the speed of the motor to insure proper timing for the opening and closing of the valves.

In case the specific gravity of the fuel is used falls below a desired point then it is advisable to admit more air to the fuel in the case K than is used normally, and for this purpose the following arrangement is made: The pipe L is provided with an extension rod $L^2$ passing through the right-hand end of the shaft $D^3$ and carrying at its outer end a valve $L^3$ provided with a valve seat $D^5$ formed on the right-hand end of the shaft $D^3$. The pipe L is connected with a suitable shifting device under the control of the operator to permit the latter to open the valve $L^3$ whenever it is desired to admit more air to the fuel in the case K, it being understood that the air passes by way of the valve seat $D^5$ into the hollow shaft $D^3$ and through the openings $D^4$ and other openings $D^6$ into the support B and from the latter by way of the openings B' into the case K, the same as the gaseous fuel passing into the support by way of the pipe L and its branch pipes L'.

In order to lubricate the universal joints G and the ball and socket connections $F^4$ of the piston rods $F^2$, $F^3$ with their corresponding pistons F and F', the following arrangement is made: The inner ends of the piston rods $F^2$, $F^3$ terminate in semicircular cups $F^5$, $F^6$ fitting onto a ball $H^2$ and the cups fit into sectional bearings $H^3$, held in the stroke element H, as plainly shown in Fig. 8. The edges of the cups $F^5$, $F^3$ are slightly spaced apart to form an annular groove $F^7$ adapted to register with a hole $H^4$ between the bearings $H^3$. Into the hole $H^4$ discharges a pipe U opening into an oil well $H^5$ formed in the hub of the stroke element H and which oil well $H^5$ is provided with an inlet $H^6$ opening into the hollow support B (see Fig. 1). The hollow bearing B connects by ports $b$ with the interior of the left-hand end of the shaft $D^3$ and which shaft has a partition $D^7$ adjacent the port $b$, while the left-hand end of the said shaft is connected by a gear pump with a lubricant supply for forcing. lubricant through this left portion of the shaft $D^3$ and by way of the ports $b$ into the middle portion of the support B, from which the lubricant flows by way of the opening $H^6$ into the oil well $H^5$. It is evident that when the motor is running and the stroke element H is rotating then the lubricant in the oil well $H^5$ flows outward by centrifugal force and passes by way of the oil pipe U and grooves $H^4$ and $F^7$ to the universal joints G to lubricate the same. The piston rods $F^2$ and $F^3$ are made hollow so that the lubricant passing between the ball $H^2$ and the cups $F^5$, $F^6$ can pass to the universal joints $F^4$ to lubricate the same, it being understood that the ball portions $F^8$ of the universal joints $F^4$ have openings $F^9$ leading to the bearings $F^{10}$ on the corresponding piston F or F', as will be readily understood by reference to Fig. 8. It is understood that when the stroke element H rotates it connects the grooves $F^7$ with the holes $H^4$ once during every revolution to allow the lubricant to pass to the universal joints G and $F^4$.

When the motor is running successive explosions are had in the group of cylinders E and likewise in the group of cylinders E', and the force of the explosions is transmitted by the pistons F and F' to the stroke elements H to cause the latter to rotate on the central support B and to carry the cylinders and their cylinder carriers D and D' along, whereby the shaft $D^3$ is rotated and the propeller J, or the parts driven from the shaft $D^3$. It is understood that the pistons F and F', which are nearly diametrically opposite to each other, are simultaneously at their power strokes and consequently insure a properly balanced running of the stroke elements H, thereby reducing the vibration of the running parts to a minimum. It is also understood that when the piston of one cylinder of a pair of cylinders is on the power stroke the piston in the other cylinder of this pair is on the compression stroke, thereby providing a cushion and aiding in the reduction of the vibration of the motor.

It is understood that but little space is required between the groups of cylinders for accommodating the single stroke element H connected with the pistons of both groups of cylinders E and E'. By the arrangement described, the weight of the motor is reduced to a minimum. In a motor for an aeroplane it is very desirable to obtain high power and speed and to reduce head resistance and vibration to a minimum with a view to permit of mounting the motor between the planes of the aeroplane for driving the propeller direct from the main shaft. By constructing the motor in the manner described above, a large number of cylinders for generating high power are arranged in a comparatively small space, and head resistance is reduced by placing the cylinders parallel to the axis of the main shaft, so that, practically, within a space twenty two and a half inches in diameter and forty-five inches in length it is possible to build a motor capable of developing about 250 horse power.

It will be noticed that by arranging the air inlet valves N, N' and the sleeve valves Q, Q', as described, none of the burning mixture in the cylinders can pass into the case K, thus preventing the explosion of an explosive mixture which may be found in case K when the fuel tanks are emptied and therefore the mixture in case K is sufficiently diluted to be dangerous.

By connecting the pitmen $F^2$, $F^3$ by universal joints with the pistons F, F', the latter are free to turn in the cylinders E, E' and hence uneven wear of pistons and cylinders is prevented.

By reference to Fig. 1 it will be noticed that the oil well H⁵ is open to the ball bearings C² to lubricate the same and also other parts contained in case K.

Having thus described my invention, I claim as new and desire to secure by Letters Patent:

1. A rotary motor, comprising two groups of cylinders, the cylinders in each group being grouped around a common axis and with the axes of the cylinders of each group parallel to each other and parallel to the said common axis, the groups of cylinders being spaced apart and being mounted to rotate bodily transversely to their axes, the cylinders having openings in their sides adjacent the inner ends, a case surrounding the inner ends of the cylinders and forming a fuel chamber between said cylinders, pistons reciprocating in the said cylinders, a stroke element within the case intermediate the groups of cylinders and rotating in a plane at an angle to the plane of rotation of the said groups of cylinders, the said pistons being connected with the said stroke element, and rigid connections connecting the groups of cylinders with each other.

2. A rotary motor, comprising two groups of cylinders, the cylinders in each group being grouped around a common axis and with the axes of the cylinders of each group parallel to each other and parallel to the said common axis, the groups of cylinders being spaced apart and being mounted to rotate bodily transversely to their axes, a fuel chamber between the cylinders, means for admitting fuel from the chamber into the cylinders, pistons reciprocating in the said cylinders, a stroke element within the chamber intermediate the groups of cylinders and rotating in a plane at an angle to the plane of rotation of the said groups of cylinders, the said pistons being connected with the said stroke element, and a plurality of rigid connections connecting the groups of cylinders with each other, the said connections each having guideways slidingly engaged by the stroke element.

3. A rotary motor, comprising two groups of cylinders spaced apart and arranged around a common axis, the cylinders being mounted to rotate bodily and having ports in their sides adjacent the inner ends, a fuel case between the groups of cylinders and into which the inner ends of the cylinders extend, pistons in the cylinders and adapted to close the ports of the cylinders, a rotatable stroke member mounted in the case and with which the piston rods are connected, the said member rotating in a plane at an angle to the plane of rotation of the cylinders, and auxiliary means for closing the ports of the cylinders during the compression strokes of the pistons and opening them during the suction strokes of said pistons.

4. A rotary motor, comprising two groups of cylinders spaced apart and arranged around a common axis, the cylinders being mounted to rotate bodily and having ports in their sides adjacent the inner ends, a fuel case between the groups of cylinders and into which the inner ends of the cylinders extend, pistons in the cylinders and adapted to close the said ports, a rotatable stroke member mounted in the case and with which the piston rods are connected, the said member being mounted to rotate in a plane at an angle to the plane of rotation of the cylinders, sleeve valves mounted on the inner ends of the cylinders and adapted to close the ports thereof, and means for operating the said valves to close the said ports on the compression strokes of the piston.

5. A rotary motor, comprising a hollow shaft, two groups of cylinders spaced apart and mounted to rotate bodily around the said shaft, the cylinders having ports in their sides adjacent to the inner ends, a fuel case between the groups of cylinders and into which extend the inner ends of the cylinders, pistons in the cylinders, a stroke member with which the piston rods are connected, mounted in the said case between the groups of cylinders to rotate in a plane at an angle to the plane of rotation of the said cylinders, auxiliary means for closing the ports of the cylinders during the compression strokes of the pistons and opening them during the suction strokes of said pistons, a fuel supply pipe in the hollow shaft, and means for admitting the fuel from said pipe into the fuel case.

6. A rotary motor, comprising a central support, two cylinder carriers mounted to rotate on the said central support, one of the said cylinder carriers having a central extension beyond one end of the said support for the transmission of the power, cylinders mounted on the said cylinder carriers with their axes parallel to the axis of the said central support, the adjacent ends of the cylinders being spaced apart, the cylinders having ports in their sides adjacent the inner ends, a fuel case secured to the cylinder carriers and surrounding the inner ends of the cylinders, pistons reciprocating in the said cylinders, and a stroke element mounted to rotate on the said central support in a plane at an angle to the plane of rotation of the said cylinder, the said stroke element being mounted in the fuel case between the cylinders and the said pistons being connected with the said stroke element.

7. A rotary motor, comprising a central support, two spaced cylinder carriers mounted to rotate on the said central support, one of the said cylinder carriers having a central extension beyond one end of the said support for the transmission of power, cylinders mounted on the said cylinder carriers with their axes parallel to the axis of the said central support, the adjacent ends of the cylinders being spaced apart, the axis of a cylinder on one carrier coinciding with the axis of a cylinder on the other carrier, the cylinders having ports in their sides adjacent the inner ends, a fuel case secured to the cylinder carriers and surrounding the inner ends of the cylinders, pistons reciprocating in the said cylinders, a stroke element mounted to rotate on the said central support in a plane at an angle to the rotation of the said cylinders, the said stroke element being arranged in the fuel case intermediate the said cylinders, the said pistons being connected with the said stroke element, connections rigidly connecting the said cylinder carriers with each other and having guideways, and bearings on the said stroke elements engaging the said guideways.

8. A rotary motor, comprising a hollow central support, spaced cylinder carriers mounted to rotate on the said support, cylinders mounted on the said carriers and having their axes parallel to the axis of the said support, pistons reciprocating in the said cylinders, a stroke element mounted to rotate on the said support in a plane at an angle to the plane of rotation of the said cylinder carrier, the stroke element being intermediate the said carriers and being connected with the said pistons, a hollow shaft on one of the carriers and extending into the hollow support, one end of the shaft being connected with a lubricant supply and having a connection with the support, an oil well in the said stroke element and in communication with the said hollow support, and means connecting the oil well with the piston connection at the stroke element.

9. A rotary motor, comprising a hollow central support, spaced cylinder carriers mounted to rotate on the said support, cylinders mounted on the said carriers and having their axes parallel to the axis of the said support, pistons reciprocating in the said cylinders, a stroke element mounted to rotate on the said support in a plane at an angle to the plane of rotation of the said cylinder carriers, the stroke element being intermediate the said carriers and being connected with the said pistons, a hollow shaft on one of the carriers and extending into the hollow support, a pipe extending into the said shaft and connected with a charge supply, the said pipe discharging into the said support, and a case connecting the cylinder carriers with each other and into which opens the said support to allow the charge to pass into the case and from the latter into the said cylinders.

10. A rotary motor, comprising a hollow central support, spaced cylinder carriers mounted to rotate on the said support, cylinders mounted on the said carriers and having their axes parallel to the axis of the said support, pistons reciprocating in the said cylinders, a stroke element mounted to rotate on the said support in a plane at an angle to the plane of rotation of the said cylinder carriers, the stroke element being intermediate the said carriers and being connected with the said pistons, a hollow shaft on one of the carriers and extending into the hollow support, a pipe extending into the said shaft and connected with a charge supply, the said pipe discharging into the said support, a case connecting the cylinder carriers with each other and into which opens the said support to allow the charge to pass into the case and from the latter into the cylinders, sleeve valves controlling the inlet of the charge into the cylinders, air inlet valves controlling the inlet of air to the cylinders, and a cam adjacent each carrier and controlling the said sleeve valves and the said air inlet valves and the exhaust valve.

11. A rotary motor, comprising a central support, two spaced cylinder carriers mounted to rotate on the said central support, one of the said cylinder carriers having a central extension beyond one end of the said support for the transmission of power, cylinders mounted on the said cylinder carriers with their axes parallel to the axis of the said central support, the adjacent ends of the cylinders being spaced apart, the axis of a cylinder on one carrier coinciding with the axis of a cylinder on the other carrier, pistons reciprocating in the said cylinders, a stroke element mounted to rotate on the said central support in a plane at an angle to the rotation of the said cylinders, the said stroke element being arranged intermediate the said cylinder carriers, the said pistons being connected with the said stroke element, and connections rigidly connecting the said cylinder carriers with each other, the said connections being hollow for the passage of electric conductors for the ignition devices of the cylinders.

In testimony whereof I have signed my name to this specification in the presence of two subscribing witnesses.

THOMAS T. LOVELACE

Witnesses:
GEORGE H. EMSLIE,
PHILIP D. ROLLHAUS.